(12) United States Patent
Cho

(10) Patent No.: US 10,151,386 B2
(45) Date of Patent: Dec. 11, 2018

(54) CONTROL METHOD FOR VEHICLE WITH DCT

(71) Applicants: HYUNDAI MOTOR COMPANY, Seoul (KR); KIA MOTORS CORPORATION, Seoul (KR)

(72) Inventor: Woon Ki Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 33 days.

(21) Appl. No.: 15/639,438

(22) Filed: Jun. 30, 2017

(65) Prior Publication Data

US 2018/0163855 A1 Jun. 14, 2018

(30) Foreign Application Priority Data

Dec. 12, 2016 (KR) .................. 10-2016-0168970

(51) Int. Cl.
| | |
|---|---|
| *F16H 61/02* | (2006.01) |
| *F16H 61/688* | (2006.01) |
| *B60W 30/18* | (2012.01) |
| *B60W 40/06* | (2012.01) |
| *B60W 40/105* | (2012.01) |

(Continued)

(52) U.S. Cl.
CPC ......... *F16H 61/0213* (2013.01); *B60W 30/18* (2013.01); *B60W 40/06* (2013.01); *B60W 40/105* (2013.01); *F16H 61/02* (2013.01); *F16H 61/688* (2013.01); *F16H 59/44* (2013.01); *F16H 59/56* (2013.01); *F16H 59/70* (2013.01); *F16H 59/72* (2013.01); *F16H 2059/663* (2013.01); *F16H 2059/725* (2013.01); *F16H 2061/0223* (2013.01)

(58) Field of Classification Search
CPC ...... F16H 61/02; F16H 61/0213; F16H 59/56; F16H 2059/663; F16H 2059/725
See application file for complete search history.

(56) References Cited

U.S. PATENT DOCUMENTS

| | | | |
|---|---|---|---|
| 2006/0040788 A1* | 2/2006 | Bassler | F16D 48/062 477/71 |
| 2011/0288735 A1* | 11/2011 | Shelton | B60W 10/02 701/68 |

(Continued)

FOREIGN PATENT DOCUMENTS

| | | |
|---|---|---|
| JP | 2013-079675 | 5/2013 |
| JP | 5873665 | 3/2016 |

(Continued)

*Primary Examiner* — Edwin A Young
(74) *Attorney, Agent, or Firm* — Brinks Gilson & Lione

(57) ABSTRACT

A control method for a vehicle with a DCT may include: a sensing step in which a controller senses a currently engaged gear of the vehicle, an inclination of a road, and a vehicle speed; a comparing step in which the controller compares a temperature of an odd-numbered clutch of the transmission with a set temperature when the currently engaged gear is a first gear, the inclination of the road is within a set range, and the vehicle speed is a set vehicle speed or less, after the sensing step; and an adjusting step in which the controller adjusts a shifting pattern to shift into a second gear when the temperature of the odd-numbered clutch is the set temperature or more, as the result of the comparing step.

6 Claims, 4 Drawing Sheets

(51) Int. Cl.
*F16H 59/44* (2006.01)
*F16H 59/70* (2006.01)
*F16H 59/72* (2006.01)
*F16H 59/56* (2006.01)
*F16H 59/66* (2006.01)

(56) References Cited

U.S. PATENT DOCUMENTS

2013/0274062 A1\* 10/2013 Arai ................. F16H 61/12
 477/5
2016/0053861 A1\* 2/2016 Mizuno ............... F16H 3/089
 74/665 K

FOREIGN PATENT DOCUMENTS

| JP | 5921126 | 5/2016 |
| KR | 10-1999-0047660 | 7/1999 |
| KR | 10-1500403 | 3/2015 |
| KR | 10-2015-0069398 | 6/2015 |

\* cited by examiner

CONTROL METHOD FOR VEHICLE WITH DCT

CROSS REFERENCE TO RELATED APPLICATION

This application claims priority to and the benefit of Korean Patent Application No. 10-2016-0168970, filed Dec. 12, 2016, which is incorporated herein by reference in its entirety.

FIELD

The present disclosure relates to a control method of reducing or preventing the clutch of a Dual Clutch Transmission (DCT) from overheating.

BACKGROUND

The statements in this section merely provide background information related to the present disclosure and may not constitute prior art.

A Dual Clutch Transmission (DCT), which is a system that automatically controls the mechanism of a manual transmission, transmits engine torque to a shifting mechanism using a dry clutch, unlike common automatic transmissions using a torque converter and a wet multiplate clutch.

In such a DCT using a dry clutch, a loss of torque generated by the clutch slipping while power is transmitted by friction of the friction material of a disc is converted into thermal energy and generates heat, but the DCT is vulnerable to the heat unlike a wet DCT because there is no cooling mechanism in the system.

We have discovered that when a driver repeats stopping and starting a vehicle in the first gear on a gentle slope, heat is concentrated on the clutch for the odd-numbered gears, so the clutch may easily overheat unlike common shifting.

SUMMARY

The present disclosure provides a control method for a vehicle with a DCT, and the method reduces or prevents a gear for odd-numbered gears from overheating when a driver repeats stopping and starting a vehicle with a DCT in the first gear on a gentle slope, in particular, by shifting directly into a second gear, depending on the temperature of the clutch for the odd-numbered gears.

In order to achieved the objects of the present disclosure, a control method for a vehicle with a DCT includes: a sensing step in which a controller senses a currently engaged gear of the vehicle, the inclination of a road, and a vehicle speed; a comparing step in which the controller compares a temperature of an odd-numbered clutch of the transmission with a set temperature when the currently engaged gear is the first gear, the inclination of the road is within a set range, and the vehicle speed is a set vehicle speed or less, after the sensing step; and an adjusting step in which the controller adjusts a shifting pattern to shift into the second gear when the temperature of the odd-numbered clutch is the set temperature or higher, as the result of the comparing step.

The adjusting step includes a step of lowering, by the controller, an up-shifting pattern to shift into an upper gear at a low vehicle speed in comparison to the previous shifting pattern.

The adjusting step may includes a step of increasing, by the controller, the gain of a torque map to increase engine torque that depends on the depression extent of the accelerator pedal.

The controller may additionally sense the incline of the temperature of the odd-numbered clutch in the sensing step, and may perform the comparing step only when the incline of the temperature of the odd-numbered clutch is equal to or greater than a set incline.

The method may further include a normalizing step in which the controller normalizes the shifting pattern into a reference shifting pattern when the temperature of the odd-numbered clutch is less than the set temperature or a temperature of an even-numbered clutch is equal to or higher than the set temperature, after the adjusting step.

The method may further include a normalizing step in which the controller normalizes the shifting pattern into a reference shifting pattern and the torque map into a reference torque map when the temperature of the odd-numbered clutch is less than the set temperature or the temperature of the even-numbered clutch is equal to or higher than the set temperature, after the adjusting step.

According to the control method for a vehicle with a DCT, when a vehicle is repeatedly and alternately stopped and started in the first gear on a gentle slope, overheating of the odd-numbered clutch can be reduced or prevented, so durability of the transmission can be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
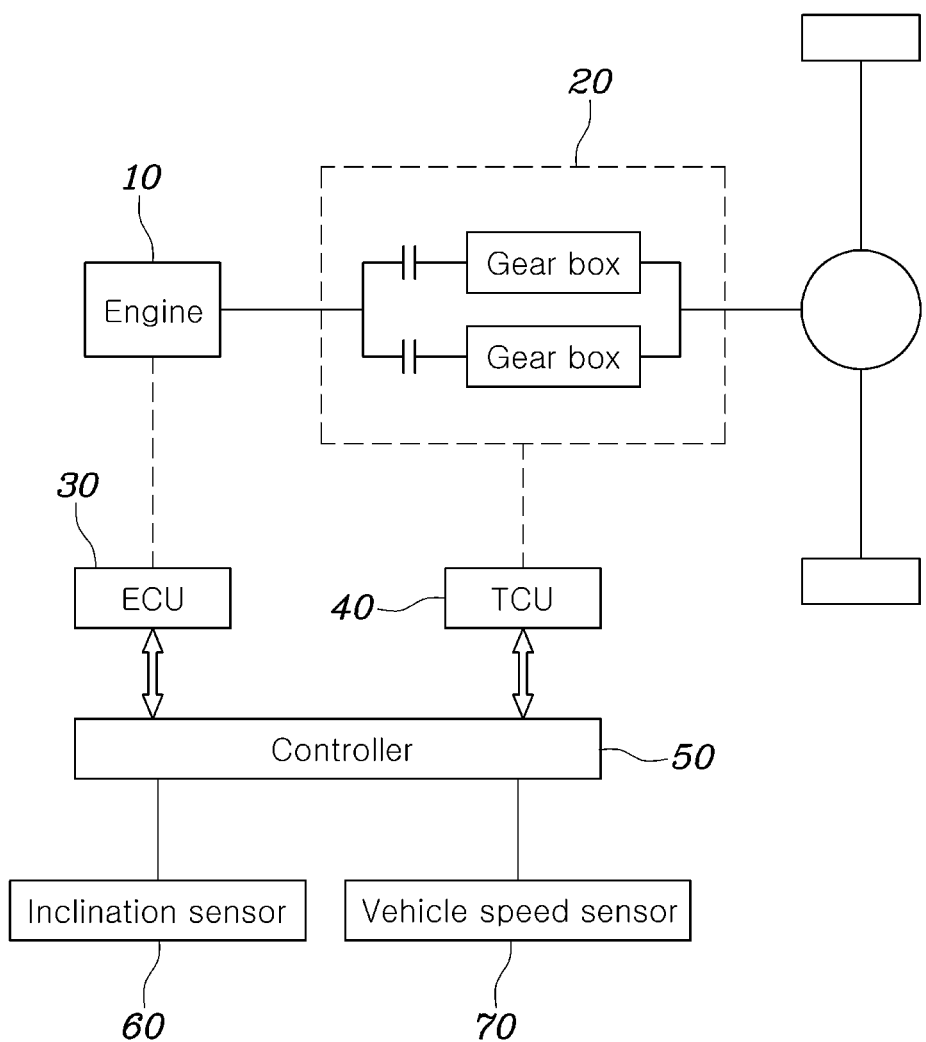
FIG. 1 is a diagram showing the structure of a vehicle with a DCT.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a diagram showing the structure of a vehicle with a DCT in one form of the present disclosure. Referring to FIG. 1, in a vehicle having a DCT, power from an engine 10 is selectively transmitted to a differential gear through a plurality of clutches in a transmission 20. The transmission is a Dual Clutch Transmission (DCT) including an odd-numbered clutch for connecting a gear box having odd-numbered gears to the engine and an even-numbered clutch for connecting a gear box having even-numbered gears to the engine.

A controller 50 in a vehicle controls engine RPM and engine torque through an electronic control unit (ECU) 30 and estimates control of gears and clutch temperature in the transmission 20 through a transmission control unit (TCU) 40. Further, in one form, the controller 50 senses information of the inclination of a road and the vehicle speed while the vehicle runs. The detailed operation of the components in the vehicle with a DCT will be described below.

Figure 2:
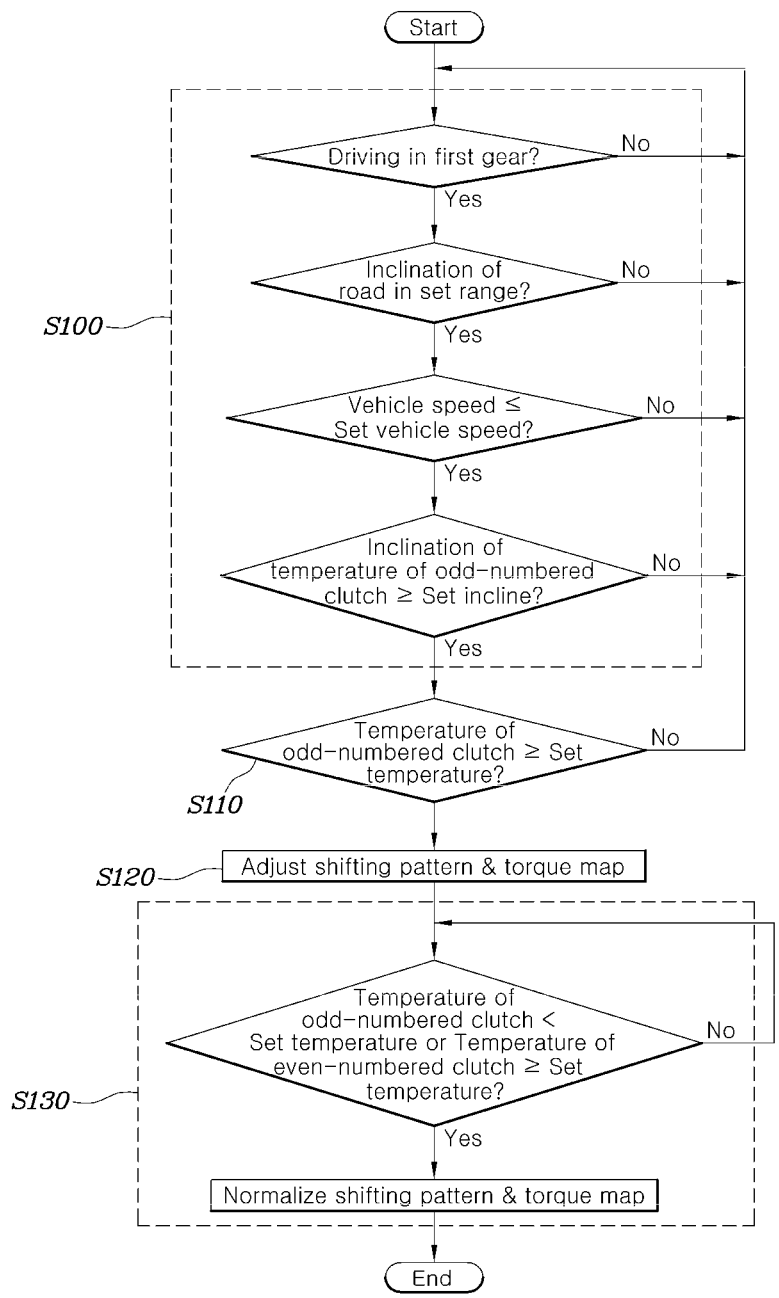
FIG. 2 is a flowchart illustrating a control method for a vehicle with a DCT in one form of the present disclosure.

FIG. 2 is a flowchart illustrating a control method for a vehicle with a DCT in one form of the present disclosure. Referring to FIG. 2, a control method for a vehicle with a DCT may include: a sensing step (S100) in which the controller 50 senses the currently engaged gear of the vehicle, the inclination of a road, and the vehicle speed; a comparing step (S110) in which the controller 50 compares the temperature of the odd-numbered clutch of the transmission 20 with a set temperature when the currently engaged gear is the first gear, the inclination of the road is within a set range, and the vehicle speed is equal to or less than a set vehicle speed, after the sensing step (S100); and an adjusting step (S120) in which the controller 50 adjusts a shifting pattern to shift into the second gear when the temperature of the odd-numbered clutch is equal to or higher than the set temperature, as the result of the comparing step (S110).

The sensing step (S100) is performed to determine whether a driver alternately repeats stopping the vehicle and starting the vehicle in the first gear on a gentle slope. In this case, the odd-numbered clutch connected to the first gear generates heat by repeating engaging/disengaging/slipping, so heat is concentrated on only the odd-numbered clutch and it may overheat. Accordingly, there is a need for a control logic for reducing or preventing the odd-numbered clutch from overheating.

For example, assuming that the range was set within inclinations corresponding to uphill slopes having an inclination of 5~15% from a level ground and the set vehicle speed was determined at 30 kph, when the controller 50 determines that the currently engaged gear is the first gear, the inclination of the road is within the range of 5~15%, and the vehicle speed is 30 kph or less through the sensing step (S100), it determines that the vehicle is in a gentle slope-repeating tip-in condition in which the vehicle is repeatedly and alternately stopped and started in the first gear on a gentle slope, and then it can execute the following logic to reduce or prevent the odd-numbered clutch from overheating.

The set range and the set vehicle speed, which are determined through tests, are variable, depending on vehicles or designers, so they should not be limited to specific values.

As the following logic, the controller 50 estimates the temperature of the odd-numbered clutch through the TCT 40 and performs the comparing step (S100) that compares the estimated temperature with the set temperature, thereby checking the degree of heat generated by the odd-numbered clutch.

When the temperature of the odd-numbered clutch is the set temperature or more, the controller 50 adjusts the shifting pattern to shift into the second gear. After shifting into the second gear is performed, the odd-numbered clutch is cooled by forcible convection due to rotation and the even-numbered clutch generates heat by slipping when it starts to operate. Accordingly, the generation of heat concentrated on the odd-numbered clutch can be distributed to the even-numbered clutch, so overheating of the odd-numbered clutch can be inhibited or prevented.

In detail, the controller 50, in the adjusting step (S120), can lower the up-shifting pattern to shift into an upper gear at a low vehicle speed in comparison to the previous shifting pattern.

Figure 3:
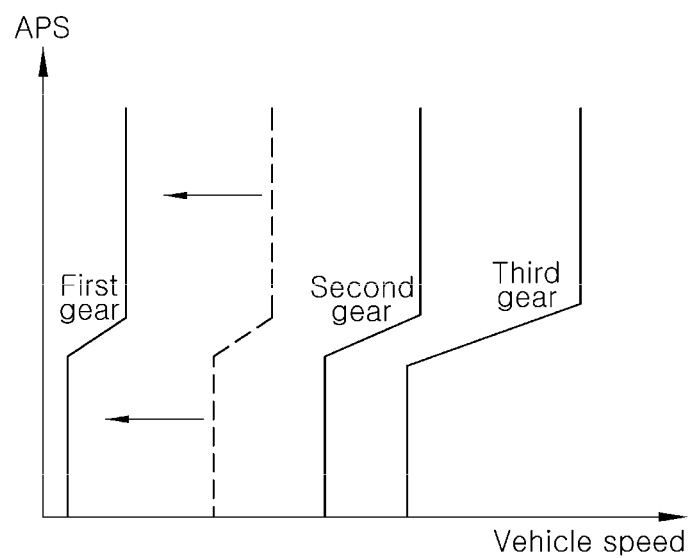
FIG. 3 is a graph showing changes in a shifting pattern in one form of the present disclosure.

FIG. 3 is a graph showing changes in a shifting pattern in one form of the present disclosure. Referring to FIG. 3, a first gear-previous shifting pattern in the up-shifting pattern before the adjusting step (S120) is like the dotted line. However, when the adjusting step (S120) is performed, the first gear-up-shifting pattern is lowered, as shown with the solid line at the ends of the arrows, so it is possible to induce shifting into the second gear at a lower vehicle speed.

Accordingly, when the vehicle is in the gentle slope-repeating tip-in condition, it is possible to reduce or prevent heat concentration on the odd-numbered clutch by quickly shifting into the second gear.

Further, in the adjusting step (S120), the controller 50 can increase the gain of a torque map to increase engine torque that depends on the depression extent of the accelerator pedal.

Figure 4:
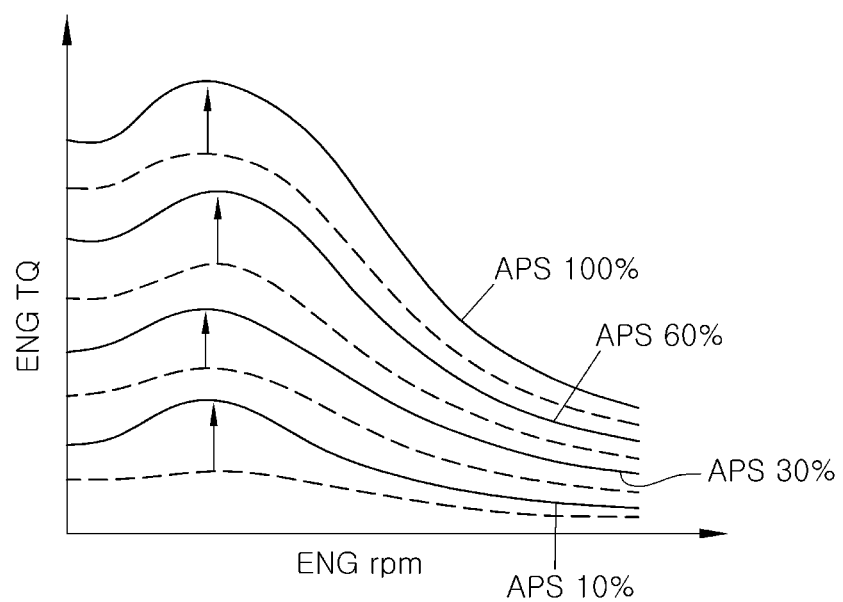
FIG. 4 is a graph showing changes in a torque map in one form of the present disclosure.

FIG. 4 is a graph showing changes in a torque map in one form of the present disclosure. Referring to FIG. 4, the dotted lines indicate torque maps before the adjusting step (S120) and the solid lines indicate torque maps after the adjusting step (S120).

That is, the gains of the torque maps are increased on the basis of APS values that are the depression amount of the accelerator pedal, so it is possible to secure power at the same level as when the vehicle is driven in the first gear, even though shifting into the second gear is quickly performed.

Referring to FIG. 2 again, the controller 50 may additionally sense the incline of the temperature of the odd-numbered clutch in the sensing step (S100), and may perform the comparing step (S110) only when the incline of the temperature of the odd-numbered clutch is a set incline or more.

Here, the controller 50 estimates an incline that depends on a change in the temperature of the odd-numbered clutch through the TCU 40, and when determining that the incline of the temperature of the odd-numbered clutch is large, the controller 50 determines that the possibility of overheating is high and performs the comparing step (S110).

On the other hand, the method may further include a normalizing step (S130) in which the controller 50 normalizes the shifting pattern into the reference shifting pattern when the temperature of the odd-numbered clutch is less than the set temperature or the temperature of the even-numbered clutch is the set temperature or more, after the adjusting step (S120).

That is, when it is determined that the temperature of the odd-numbered clutch is normalized or the even-numbered clutch is overheated, the first gear-shifting pattern can be heightened into the previous shifting pattern to shift into the first gear.

Accordingly, it is possible to maintain the highest road-ability of the vehicle and inhibit or prevent overheating of the even-numbered clutch.

If a torque map is adjusted upward in the adjusting step (S120), the method may further include a normalizing step (S130) in which the controller 50 normalizes the shifting pattern into the reference shifting pattern and the torque map into a reference torque map when the temperature of the odd-numbered clutch is less than the set temperature or the temperature of the even-numbered clutch is the set temperature or more, after the adjusting step (S120). That is, the torque map is normalized to correspond to shifting-into-first gear to secure the previous roadability of the vehicle.

According to the control method for a vehicle with a DCT, when a vehicle is repeatedly and alternately stopped and started in the first gear on a gentle slope, overheating of the odd-numbered clutch can be reduced or prevented, so durability of the transmission can be improved.

Although the present disclosure was described with reference to specific forms shown in the drawings, it is apparent to those skilled in the art that the present disclosure may be changed and modified in various ways without departing from the scope of the present disclosure.

What is claimed is:

1. A control method for a vehicle with a Dual Clutch Transmission (DCT), the method comprising:
    a sensing step in which a controller senses a currently engaged gear of the vehicle, an inclination of a road, and a vehicle speed;
    a comparing step in which the controller compares a temperature of an odd-numbered clutch of the transmission with a set temperature when the currently engaged gear is a first gear, the inclination of the road is within a set range, and the vehicle speed is equal to or less than a set vehicle speed, after the sensing step; and
    an adjusting step in which the controller adjusts a shifting pattern to shift into a second gear when the temperature of the odd-numbered clutch is equal to or higher than the set temperature, as a result of the comparing step.

2. The method of claim 1, wherein the adjusting step includes lowering, by the controller, an up-shifting pattern to shift into an upper gear at a low vehicle speed in comparison to a previous shifting pattern.

3. The method of claim 1, wherein the adjusting step includes increasing, by the controller, a gain of a torque map to increase an engine torque that depends on a depression extent of an accelerator pedal.

4. The method of claim 3, further comprising:
    a normalizing step in which the controller normalizes the shifting pattern into a reference shifting pattern and the torque map into a reference torque map when the temperature of the odd-numbered clutch is lower than the set temperature or a temperature of an even-numbered clutch is equal to or greater than the set temperature, after the adjusting step.

5. The method of claim 1, further comprising: sensing, by the controller, an incline of the temperature of the odd-numbered clutch in the sensing step, and performing the comparing step only when the incline of the temperature of the odd-numbered clutch is equal to or greater than a set incline.

6. The method of claim 1, further comprising:
    a normalizing step in which the controller normalizes the shifting pattern into a reference shifting pattern when the temperature of the odd-numbered clutch is lower than the set temperature or a temperature of an even-numbered clutch is equal to or higher than the set temperature, after the adjusting step.

* * * * *